(12) United States Patent
Carbune et al.

(10) Patent No.: US 12,041,057 B2
(45) Date of Patent: *Jul. 16, 2024

(54) EXTENDING APPLICATION ACCESS ACROSS DEVICES

(71) Applicant: Google LLC, Mountain View, CA (US)

(72) Inventors: Victor Carbune, Zürich (CH); Sandro Feuz, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,900

(22) Filed: Jan. 26, 2023

(65) Prior Publication Data
US 2023/0171258 A1   Jun. 1, 2023

Related U.S. Application Data

(63) Continuation of application No. 16/606,896, filed as application No. PCT/US2018/019220 on Feb. 22, 2018, now Pat. No. 11,595,397.

(Continued)

(51) Int. Cl.
*H04L 67/52*   (2022.01)
*G06F 21/62*   (2013.01)
(Continued)

(52) U.S. Cl.
CPC .......... *H04L 63/102* (2013.01); *G06F 21/629* (2013.01); *H04L 63/08* (2013.01);
(Continued)

(58) Field of Classification Search
CPC ....... H04L 63/102; H04L 63/08; H04L 67/18; H04L 67/24; H04L 67/306; G06F 21/629; G06F 9/442
(Continued)

(56) References Cited

U.S. PATENT DOCUMENTS 7,831,930 B2   11/2010   Dresti et al.
8,079,067 B2 *   12/2011   Thompson ............ H04L 63/102
726/5

(Continued)

FOREIGN PATENT DOCUMENTS

WO   2005/071518   4/2005

OTHER PUBLICATIONS

International Preliminary Examining Authority, Written Opinion mailed on Nov. 21, 2019, issued in connection with International Patent Application No. PCT/2018/019220, filed on Feb. 22, 2018, 6 pages.

(Continued)

*Primary Examiner* — Khanh Q Dinh
(74) *Attorney, Agent, or Firm* — McDonnell Boehnen Hulbert & Berghoff LLP

(57) ABSTRACT

Methods, systems, and apparatus, including computer programs encoded on a computer storage medium, for extending application access across devices. In some implementations, an electronic device receives a request to provide access to the electronic device to a particular user that is not registered as a user of the electronic device. The electronic device receives authentication credentials for the particular user. The electronic device provides the authentication credentials to a server system and receives data from the server system that (i) indicates that the providing access to the electronic device in a guest mode is authorized, and (ii) indicates a state of an instance of an application installed on a second device. The electronic device provides access to the electronic device in the guest mode that provides an interface that at least partially recreates the state of the instance of the application installed on the second device.

18 Claims, 5 Drawing Sheets

Related U.S. Application Data

(60) Provisional application No. 62/599,478, filed on Dec. 15, 2017.

(51) Int. Cl.
| | | |
|---|---|---|
| *H04L 9/40* | (2022.01) | |
| *H04L 67/306* | (2022.01) | |
| *H04L 67/54* | (2022.01) | |
| *G06F 9/4401* | (2018.01) | |

(52) U.S. Cl.
CPC ............ *H04L 67/306* (2013.01); *H04L 67/52* (2022.05); *H04L 67/54* (2022.05); *G06F 9/442* (2013.01)

(58) Field of Classification Search
USPC ................ 709/220, 224, 225, 226, 228, 232
See application file for complete search history.

(56) References Cited

U.S. PATENT DOCUMENTS

| | | | |
|---|---|---|---|
| 8,214,890 B2 | 7/2012 | Kirovski et al. | |
| 8,533,794 B2* | 9/2013 | Thompson | H04L 63/102 726/5 |
| 9,112,849 B1 | 8/2015 | Ahlin et al. | |
| 9,590,848 B2 | 3/2017 | Prakash et al. | |
| 9,596,231 B1 | 3/2017 | Nandakumar et al. | |
| 9,728,071 B2 | 8/2017 | Janardhanan et al. | |
| 9,729,628 B2 | 8/2017 | Ortiz et al. | |
| 9,792,298 B1* | 10/2017 | Taylor | G06F 16/1844 |
| 9,811,662 B2* | 11/2017 | Sharpe | G06F 16/183 |
| 10,057,245 B2* | 8/2018 | Yastrebenetsky | H04L 63/0236 |
| 10,205,722 B2 | 2/2019 | Light | |
| 10,697,619 B2 | 6/2020 | Toyohisa et al. | |
| 11,595,397 B2* | 2/2023 | Carbune | H04L 67/54 |
| 2008/0168541 A1* | 7/2008 | Thompson | H04L 65/612 726/5 |
| 2011/0141276 A1 | 6/2011 | Borghei | |
| 2012/0072974 A1* | 3/2012 | Thompson | H04L 65/612 726/5 |
| 2013/0212579 A1* | 8/2013 | Ben-Shaul | H04L 67/1095 718/1 |
| 2013/0254314 A1 | 9/2013 | Chow | |
| 2013/0288648 A1 | 10/2013 | Light | |
| 2014/0068713 A1 | 3/2014 | Nicholson et al. | |
| 2014/0149347 A1* | 5/2014 | Ben-Shaul | G06F 9/451 707/623 |
| 2014/0289201 A1* | 9/2014 | Chan | G06F 16/27 707/650 |
| 2015/0347552 A1* | 12/2015 | Habouzit | G06F 16/178 707/613 |
| 2016/0313250 A1 | 10/2016 | Matsuura | |
| 2016/0330270 A1 | 11/2016 | Folk | |
| 2017/0019394 A1* | 1/2017 | Yastrebenetsky | H04L 63/0236 |
| 2017/0054703 A1 | 2/2017 | Nandakumar et al. | |
| 2017/0277437 A1* | 9/2017 | Jones | G06F 16/178 |
| 2018/0061202 A1 | 3/2018 | Mookan | |
| 2018/0114015 A1 | 4/2018 | Nuseibeh et al. | |

OTHER PUBLICATIONS

International Searching Authority, International Report Report and Written Opinion mailed Oct. 8, 2018, issued in connection with International Patent Application No. PCT/2018/019220, filed on Feb. 22, 2018, 17 pages.

Mossbert, Walt, "Review: How to Use a Borrowed Phone With Your Own Phone Number," URL<https://www .recode.net/20 | 4/12/31/11634096/review-how-to-use-a-borrowed-phone-with-your-own-phone-number>, Dec. 31, 2014, 6 pages.

\* cited by examiner

EXTENDING APPLICATION ACCESS ACROSS DEVICES

CROSS-REFERENCE TO RELATED APPLICATIONS

The present application is a continuation of U.S. patent application Ser. No. 16/606,896, filed on Oct. 21, 2019, titled "Extending Application Access Across Devices," which is a national stage application under 35 U.S.C. § 371 of International Application No. PCT/US2018/019220, filed Feb. 22, 2018, and titled "Extending Application Access Across Devices," which claims priority to U.S. Patent Provisional Application No. 62/599,478, filed Dec. 15, 2017, titled "Extending Application Access Across Devices," which are incorporated herein by reference in their entirety.

BACKGROUND

As phones and other mobile devices have become increasingly capable, people rely on them more and more. Many people use their phones as their primary means of communication and organization, using their phones for email, messaging, scheduling and calendar management, note taking, navigation, and more. As a result, many users would be severely inconvenienced if they lost access to their phones, for example, if the battery runs out of power or if the user does not have the phone present. In particular, without his phone, a user would generally lose access to the user's applications installed on the phone and the communication ability that the applications provide.

SUMMARY

In some implementations, an electronic device of one user can grant limited or temporary access to another user. The technique can allow a user to log-in to a device of another person, e.g., a trusted friend or family member, when the user's own device runs out of battery power or is otherwise unavailable. A device may grant access to a guest user in a limited manner, even though the guest user is not registered as a user of the device. In some instances, the device may grant guest access based on the guest user's credentials, e.g., credentials used to access the guest user's inaccessible device.

When granting limited guest access, a device can temporarily recreate or emulate the state or configuration of an application on a user's primary device. For example, when a user logs in as a guest to a friend's device, the friend's device can provide functionality of the same application installed on the user's currently inaccessible device. Even on the friend's device, the application can provide an interface that provides the same user data and configuration that would be provided on the application on the user's inaccessible device. As a result, when the user loses access to his own device, he can seamlessly continue using an application on an alternate device of another person. In some instances, the friend's device provides a restricted or scaled back version of the application (e.g., a lightweight version with limited functionality).

As an example, a user may have a messaging application installed on his phone, with the application providing user-specific contact lists, chat histories, and application settings. If the user's phone battery is depleted, the user may log-in to a friend's nearby phone as a guest, using the user's own access credentials (e.g., password, fingerprint, swipe pattern, etc. for the phone with the depleted battery) rather than using the friend's access credentials. The phone provides access to the messaging application in a guest mode, with the application interface providing the user's contact lists, chat histories, and application settings. As a result, despite losing access to his own phone, the user can resume use of the messaging application on the friend's phone with minimal effort, and with the interface shown as if it were the user's own phone.

Devices may use various techniques to maintain security while allowing users access across multiple devices. For example, the ability to log-in to a device as a guest user may be conditioned on the device being pre-authorized for access by the guest user. A user may designate a specific set of devices that are authorized to provide guest access for that user, thus preventing the user's account from being accessed using an unknown device. As another example, guest access for a user may be allowed only when the user's primary device is confirmed to be inaccessible, e.g., when a server confirms a low power condition of the primary device, or if a server confirms that the primary device is in secure location (e.g., left at home) while the user is elsewhere. Another technique may require a user input on the primary device to authorize a transfer of access from the primary device to another device. Other verification techniques, including analysis of context information using trained machine learning models, can also be used.

In one general aspect, a method performed by an electronic device includes: receiving, by the electronic device, a request to provide access to the electronic device to a particular user that is not registered as a user of the electronic device; receiving, by the electronic device, authentication credentials for the particular user; providing, by the electronic device, the authentication credentials for the particular user to a server system; after providing the authentication credentials, receiving, by the electronic device, data from the server system that (i) indicates that the providing access to the electronic device in a guest mode is authorized, and (ii) indicates a state of an instance of an application installed on a second device for which the particular user is registered as a user; and providing, by the electronic device, access to the electronic device in the guest mode that provides an interface that at least partially recreates the state of the instance of the application installed on the second device for which the particular user is registered as a user.

Implementations may include one or more of the following features. For example, in some implementations, the electronic device has a registered user, and the electronic device blocks access to user data for the registered user in the guest mode.

In some implementations, the electronic device has an instance of the application installed on the electronic device, and the electronic device provides access to a subset of the functionality of the application in the guest mode.

In some implementations, the received authentication credentials are credentials that unlock a device for which the particular user is a registered user.

In some implementations, the received authentication credentials are credentials that the particular user designated for allowing access, in the guest mode, to user data of the particular user.

In some implementations, the electronic device is a mobile phone that is not associated with any user account of the particular user.

In some implementations, providing access to the electronic device in the guest mode includes providing access to a native application that is installed on the electronic device and that is not a web browser, and the guest mode provides at least partial functionality of the native application, with the interface of the native application being configured to replicate at least a portion of an interface on the second device for which the particular user is a registered user.

In another general aspect, a method performed by an electronic device includes: providing, by the electronic device (which may correspond to the "second device" of the first general aspect described in paragraph above), data indicating a state of an application on the electronic device, where the electronic device is registered to a user; identifying, by the electronic device, one or more other devices (which may correspond to the "electronic device" of the first general aspect described in paragraph above) that the user has authorized to provide access to the application, wherein the user is not registered as a user of the one or more other devices; and providing, to the server system or to the one or more other devices, data enabling the user to log in to the one or more other devices to obtain access to the application.

In some implementations, the method further comprises determining, by the electronic device, that a battery power level of the electronic device is below a threshold, wherein the data enabling the user to log in to the one or more other devices to obtain access to the application are provided in response to determining that the battery power level is below the threshold.

In some implementations, providing the data enabling the user to log in to the one or more other devices includes sending a message to the server system indicating that the battery power level is below the threshold.

In some implementations, the method includes, after providing the data enabling the user to log in to the one or more other devices, shutting down the electronic device.

In some implementations, the method includes: determining that a particular device of the one or more other devices is within a threshold level of proximity to the electronic device; and indicating, on a display of the electronic device, that the particular device is nearby.

In some implementations, determining that the particular device is within a threshold level of proximity is based on a wireless signal from the particular device received by the electronic device or an indication of the location of the particular device from the server system.

In some implementations, the method includes, after indicating that the particular device is nearby, receiving user input indicating authorization to enable access, on the particular device, to an instance of the application with user-specific data for the user. Providing the data enabling the user to log in to the one or more other devices includes sending send data to enable log in of the user on the particular device.

In some implementations, the method includes displaying a list of suggested devices for obtaining access to the application based on proximity of other devices to the electronic device and users associated with the other devices.

In another general aspect, a method performed by one or more computers includes: storing, by the one or more computers, data indicating a state of an instance of an application that is installed on a first device (which may correspond to the "second device" of the first general aspect described in paragraph above) registered to a first user; receiving, by the one or more computers, data from the first device indicating authorization by the first user to permit the application to be accessed on a second device (which may correspond to the "electronic device" of the first general aspect described in paragraph above) registered to a second user; receiving, by the one or more computers, a request to grant access to the first user on the second device of the second user; and based on data indicating the authorization by the first user, providing, by the one or more computers, data to the second device enabling the second device to present, on the second device, an interface of the application that at least partially recreates the state of the instance of the application on the first device.

In some implementations, the first device is a mobile phone of the first user and the second device is a mobile phone of the second user.

In some implementations, the method includes determining that the first device is likely inaccessible to the first user, and providing the data enabling the second device to present the interface is based on determining that the first device is likely inaccessible to the first user.

In some implementations, determining that the first device is likely inaccessible to the first user includes determining that the first device is powered off or has a battery power level below a threshold.

In some implementations, the method includes determining that the second device is within a threshold level of proximity of the first device. Providing the data enabling the second device to present the interface is based on determining that the second device is within a threshold level of proximity of the first device.

In some implementations, the method includes receiving user credential data for the first user from the second device; and verifying that the user credential data is valid for the first user. Providing the data enabling the second device to present the interface is based on verifying that the user credential data is valid for the first user.

In some implementations, the first device has a device-level user credential for login to the first device. The first device has multiple applications that each have a separate user account with different application-level login credentials. The user credential data provides the device-level user credential. The method further includes providing, based on verifying the device-level user credential, data enabling the second device to provide an interface of each of the multiple applications having user-specific content replicated from instances of the multiple applications on the first device, without requiring the application-level login credentials to be provided.

Various methods or processes are discussed and claimed herein. Other embodiments include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
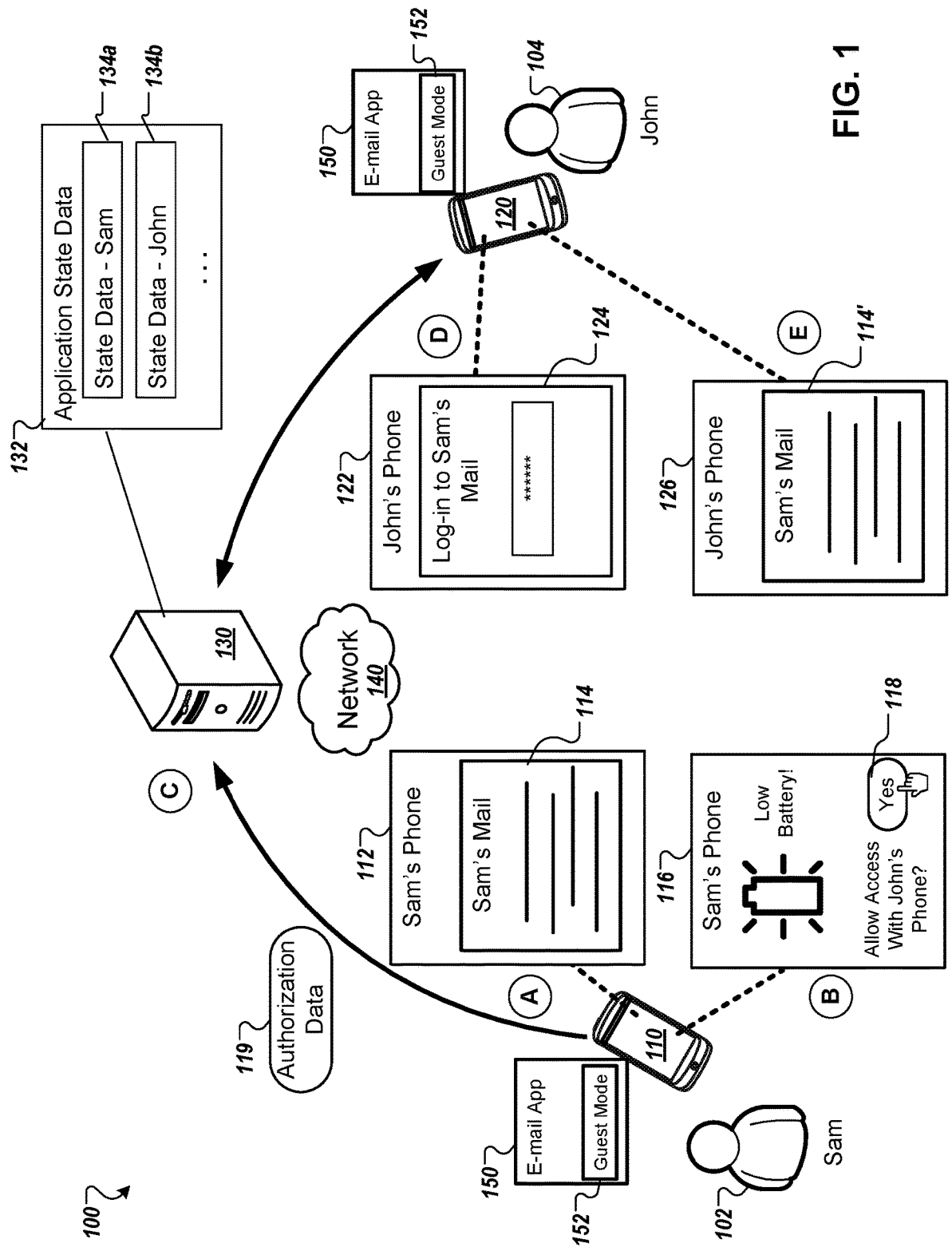
FIG. 1 is a block diagram that illustrates an example of a system for extending application access across devices.

FIG. 1 is a block diagram that illustrates an example of a system 100 for extending application access across devices. The system 100 includes a first device 110 of a first user 102, "Sam," and a second device 120 of a second user 104, "John." The system 100 also includes a server system 130 and a communication network 140. FIG. 1 illustrates a flow of data represented by stages (A) to (E).

The illustrated example shows how the first user 102 can use a friend's device 120 to gain access to an application on the first user's 102 device 110. With more and more communication functionality being incorporated in mobile phones, phones increasingly become a single point of failure that can cause a user to become unreachable. A common reason for losing access to a phone is running out of battery power. The techniques discussed below allow a first user to deal with this situation by gaining access to a friend's phone. For example, a user's phone is almost out of battery power, but the user may be in the company of trusted friends who also have smartphones with them. With the techniques in this application, the user may transfer some of the functionality of his phone (which is almost out of battery) to one of his friend's phones. Access on the friend's phone can be provided in a guest mode that at least partially clones or mimics the interface and functionality of the user's own phone, showing user data and configuration specific to the user but on a device that is not the user's device.

Access in the guest mode can take the form of one or more applications whose state from a first device 110 is temporarily recreated on a second device 120. For example, coordination between the first device 110, the second device, 120, and the server system 130 can record user data and application state information for an application 150 on the first device 110. When the first device 110 is unavailable to the first user 102, the first user 102 may obtain access to the same application 150 using the second device 120 of the second user 104. The access can be provided in a guest mode that automatically recreates, on the interface of the second user's 104 device 120, user-specific and device-specific aspects of the application 150 on the first user's device 110. For example, for a messaging application, the guest mode interface can provide the same contacts, received messages, sent messages, draft messages, and other data provided by the application 150 on the first device 110.s. The guest mode interface can at least partially clone or mimic the most recent interface of the application, allowing the first user 102 to pick up use of the application 150 where he left off using the application 150 on the first device 110. This can allow a substantially seamless transition to switch from a user using an application on his own device, and then using the application on a different user's device. In some implementations, the user may even continue a session of the application from his own device on the other user's device, with the state of the application and the session information being synchronized with a server system so it is automatically provided on the other device.

In many respects, the first user 102 can log in to and use the device 120 of the second user 104 as if it were the first user's own device 110, even though the device 110 is inaccessible. For example, access may be provided so that the first user 102 can log in to the device 120, using the first user's credentials, even though the first user 102 is not a registered or specifically authorized user of the second device 120. The guest mode can also block access to the user data and applications of the second user 104, so that the first user 102 obtains access only to the first user's applications and data.

In the example of FIG. 1, the device 110 of the user 102 and the device 120 of the user 104 both have an application 150 installed. This application 150 includes, In addition to the standard components of the application 150, a guest functionality 152 that represents a lightweight, limited version of the application 150. The guest functionality 152 may be distributed as part of the application 150, so that each device that has the application 150 installed has the ability to allow access by a different user in a guest mode. The guest functionality 152 may be provided in various forms. For example, the guest functionality 152 may include executable code, e.g., for generating and providing a guest mode or even a separate, stand-alone guest version of the application 150. As another example, the guest functionality 152 may be provided as rules, settings, or configuration data that specifies a subset of the application 150 that becomes accessible in the guest mode.

In stage (A), the first user 102, "Sam," is using his device 110 to access the application 150. The example shows the device 110 providing a user interface 112 with a view 114 of the application 150. The device 110 periodically communicates with the server system 130 to store application state information for the application 150. This communication may synchronize any appropriate data of the application 150 and its current configuration on the device 110, e.g., current settings, current views provided to the user, user data or recent history, user inputs received, and so on. The stored application state information can be refreshed at regular intervals (e.g., every 5 seconds, every 30 seconds, etc.), in response to changes in the application 150 (e.g., changes in settings, views shown, etc.), in response to user inputs to the application 150, and so on. The synchronization may be triggered by each user input or change in the application 150, or by only certain types of inputs or changes (e.g., synchronizing when a user enters new text, but not when the user simply scrolls). Synchronization may also be triggered by requests by the server system 130 for updated application state data.

In general, the server system 130 may store application state data for all instances of the application, e.g., storing the unique state for each device of each different user. This information can later be used to recreate or clone the interface of the application 150, with a user's own data and settings, on a device of a different user.

In stage (B), the first device 110 determines that is battery power level is below a threshold, e.g., at a critically low power level, such as 10%, 5%, or less. Before powering down, the device 110 generates and displays a notification of the low-power condition on a user interface 116. As part of the notification, the device 110 provides a control 118 for the user to authorize transfer of access from the first device 110 to another device, e.g., John's device 120. The first user 102 provides input using the control 118 to confirm that access to the application 150 with the user's account may be performed on the second device 120.

In some implementations, to maintain security, various conditions can be placed on the ability to extend access to his data, applications, and other resources from his device to the device of another user. For example, a user may be limited to gaining access to his account via a guest mode to situations where the user's device is determined to likely be inaccessible, e.g., very low battery charge, device powered off, device is lost or left at home or some other area apart from the user, etc. The ability of any device to enter a guest mode showing the first user's 102 applications may be restricted by the server 130 unless conditions support likely inaccessibility of the device 110 to the owner, the first user 102.

As another security measure, a user 102 may be required to explicitly approve devices to be able to access applications, with user-specific application state and user data, before guest mode access can be granted. Users may pre-authorize one or more devices, for example, by identifying trusted contacts, which in turn can designate the phones or other device of those contacts as authorized to provide guest mode access when other conditions are met.

The first device 110 can determine whether any of the authorized devices are nearby the user 102 when the battery is low, and can provide an indication or suggestion of those devices to a user. The first device 110 may determine that a device is in proximity by the exchange of short-range wireless (e.g., radiofrequency) communications, e.g., over Bluetooth, Wi-Fi, or another protocol. As another example, the devices 110, 120 may provide their GPS coordinates to the server system 130, and the server system 130 can provide data identifying which devices are near, or more particularly, which devices are near and have been authorized for providing the guest mode for the user's applications.

Optionally, as shown in FIG. 1, the device 110 can provide an option for a user to specifically approve access on another device in response to a certain condition, such as low battery power. Selecting the option may, in some instances, begin communication with the server 130 and or the other device 120 to being the process of entering the guest mode and providing access to temporary, personalized of one or more applications on the second device 120.

In stage (C), the first device 110 transmits various types of context information to the server system 130. This can include information about the location of the device 110, a battery charge level of the device 110, a profile of recent movement of the device 110, and so on. The first device 110 may also provide data indicating other devices that have been authorized to be used for a guest mode recreating aspects of applications on the device 110. The server system 130 receives and processes this information and can store the information for determining whether to allow or deny later attempts to enter the guest mode for this user's account.

In stage (D), the user 102 borrows the second device 120 from the second user and initiates guest mode access. This may be triggered by any of various actions. For example, a lock screen of the device 120 may provide an icon or other control for a user to enter a username, phone number, or other user identifier as well as a password, personal identification number (PIN), touchscreen swipe pattern, biometric identifier (e.g., fingerprint, face scan, eye scan, etc.), or other authentication data. As another example, when the user 102 confirms that guest mode access is desired at the current time, e.g., through the control 118 in the interface 116, data indicating this desired access can be sent to the device 120, e.g., by the server system 130 or through a direct communication with the device 110.

The second device 120 provides a user interface 122 that enables the user 102 to enter login credentials. Because the guest mode access provides access to user-specific application state and user data, the user 102 can be required to authenticate. The server system 130 can store reference data that allows it to determine whether the correct credential has been provided. In some implementations, the user 102 may be able to enter the guest mode using his credentials for the device 110. For example, the same code or input that would unlock the device 110 may be effective to grant access in the guest mode. This device-level credential, e.g., one managed by the operating system of the device 110 for general access to the device 110, may allow access to any and all applications of the user that are available to be accessed in the guest mode. For example, for guest mode access to an e-mail application, the user 102 may supply a password for unlocking the device 110, not a password for the e-mail account used by the e-mail application. The same single device-level or operating system password may also be sufficient to gain access in the guest mode to other applications of the first device 110, for example, a messaging application, a calendar application, and so on, so that individual application-specific passwords need not be provided to gain guest mode access.

In some implementations, the user 102 may set credentials for accessing the guest mode that are different from those used to access the device 110 generally. This can allow the user to enter the guest mode without disclosing the credential for accessing the device 110.

Once the user 102 enters his credentials, the second device 120 communicates with the server system 130 to authenticate the user 102 and determine whether to provide guest access. Since the user 102 is not a registered user of the second device 120, the device 120 generally does not store reference data to determine whether the entered credentials are valid. The device 102 may rely on the server system 130 to evaluate the credentials input on the interface 122. In addition, the server system can determine whether other criteria for providing the guest mode have been satisfied. These criteria may include a requirement that the user 102 give prior authorization to allow his identity or account to be accessed in guest mode on the device 120 (perhaps by giving authorization for the user 104 who is associated with the device 120). Another example is a requirement that the first device 110 likely be currently inaccessible to the user 102 before guest mode access for the applications on the first device 110 is permitted. The server system 130 may examine various aspects of the context of the devices 110, 120, including evaluating a risk level for the requested access using trained machine learning models.

In the example, the server system 130 determines that the entered credentials are valid for granting guest mode access to the application 150. The server system 130 also determines that the first device 110 is inaccessible, due to the low battery charge, and the second device 120 has been authorized to be used for providing guest mode access to the applications on the first device 110. Based on these determinations, the server system 130 indicates to the second device 120 that access should be granted.

The server system 130 also retrieves application state information 134a for the application 150 and provides it to the second device 120 over the network. This state information 134a can indicate user preferences, settings, most recent views, user data used by the instance of the application 150 on the first device 110, or other aspects of the manner in which the application 150 is configured or actually used on the first device 110. In some implementations, the state information provides a type of snapshot of a current or recent state of the application 150, whether or not the application 150 is currently running on the first device 110.

In stage (E), the second device 120 uses the application state information 134a provided by the server system 130 to provide a personalized view of the application 150. The second device 120 includes the application 150, but does not show a view of the application 150 as configured for the user 104 of the second device 120. Instead, in the guest mode, the application state information 134a is used to provide a view representing the configuration or user data of the user 102. In the guest mode, the application 150 may provide a limited or restricted set of functionality, e.g., a proper subset of the total functionality of the application 150.

Because the state of the application 150 was recorded before the device 110 shut down, the user interface 126 provided by the second device 120 can closely replicate the view and content of the application 150 on the user device 110. For example, the view 114 of on the first device 110 can be shown as a view 114' that is the same or similar, allowing the user to continue using many functions of the application 150 on the second device 120. For example, the guest mode interface for an e-mail application on one device may provide the same read and unread messages, sent messages, drafts, and other content as the native application view on the user's own device.

In the example of FIG. 1, both devices 110, 120 have the same application installed, and this application 150 provides the guest mode functionality. In some implementations, it is not required for the same applications to be present. For example, guest mode access may be provided through a web application or virtual environment run by the server system 130, so that an interface approximating the interface of the application 150 may be provided on the device 120 in guest mode even if the application 150 is not installed. As another example, small application elements for the purpose of providing guest mode access for an application may be made available. The guest mode functionality 152 may be provided separate from the full application 150 and may be dynamically downloaded, as needed, when guest mode is actually used.

In many cases, devices have a single primary user. For example, phones generally have a single user account and single phone number associated with them. The guest mode or extended application access discussed above applies equally for devices that have multiple registered users, since it can allow a user to gain access to a device where the user is not registered as a user, regardless of how many other users may be registered with the device. Unlike many other systems that provide a form of guest access for non-registered users, the present technique can provide user-specific data from a user within the guest mode, and even recreate or replicate at least some portions of the state of an instance of the application on the user's own device. Thus, the guest mode access is not a generic experience with only default interfaces, it can be a personalized, user-specific interface that in can enable the user to seamlessly continue using applications from his device on a different user's device. Because user-specific data and application states are provided, the guest mode can use the security measures discussed above to limit access. For example, a user account may accessed through the guest mode on a device only when the user has explicitly authorized that the device provide access to that account. In addition, or as an alternative, the system can require the user's primary device to likely be inaccessible to the user before guest access for the user's account is allowed.

The example of FIG. 1 shows the user 102 gaining access, on the device 120, to a personalized or recreated interface for a specific application 150. Logging into the device 120 in the guest mode may provide the user 102 access to multiple different applications of the first device 110, each with is state or interface derived from a recent state or configuration of the instance of the application on the first device 110. For example, after the user 102 logs in to the device 120 in the guest mode, the second device 120 may provide icons or other elements listing each of the applications that are in common between the devices 110, 120 and are available to be run in the guest mode. The second device 120 may obtain this information based on data provided by the server system 130, which may indicate the applications on the first device 110 or a set of those applications for which the server system 130 can provide state information. The second device 120 can compare this information with a list of applications installed on the second device 120 which support the guest mode. Applications in common to both lists may be indicated on a type of home screen or launch screen, from which the user 102 may select which applications to initiate in guest mode.

To facilitate guest mode access, an application programming interface (API) can be set for application developers to implement guest mode login functionality from different devices. The API can provide a mechanism for allowing partial functionality of applications present on the user's device 110, and not entirely lock the user 102 out once the device 110 becomes inaccessible, e.g., due to running of battery. When developing an application, developers can specify which portions of an application are available in the guest mode, and which are not. By specifying these elements at development, the overall program size may be reduced by avoiding the need for duplicate code. Elements of an application that are available in standard mode and guest mode need not be duplicated.

Figure 2B:
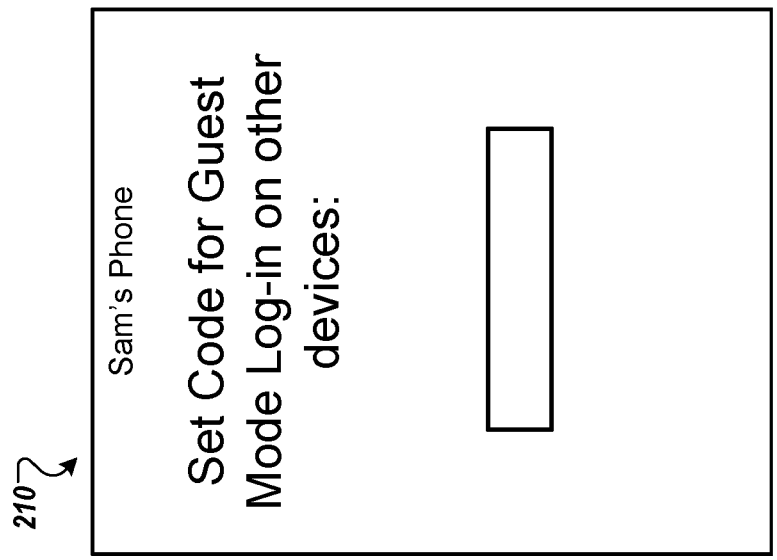
FIGS. 2A and 2B are examples of user interfaces for extending application access across devices.
Figure 2A:
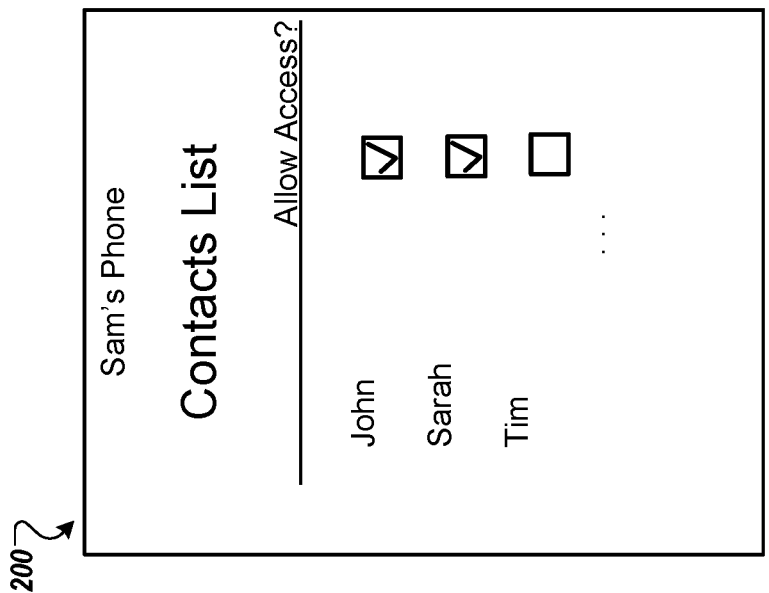

FIG. 2A is a diagram illustrating a user interface 200 for extending application access across devices. The user interface 200 shows a list of contacts of the first user 102, along with controls that enable the first user 102 to pre-authorize the devices of certain people to provide access to the first user in the guest mode. Since the guest mode would provide user data specific to the user first user 102, the first user can use the user interface 200 to limit the set of devices for which guest mode can be used for his identity or account. By limiting the set of devices to those of trusted individuals, e.g., certain friends and family members, the first user 102 can reduce the risk that a person may use guest mode to access his user data without his approval.

In general, a user 102 may manually enable a set of other devices to be able to provide guest mode functionality to provide access to functionality from the device 110. This can be done by designating certain contacts as "trusted" contacts, so that the devices of those trusted contacts will be enabled to provide guest mode access to the user 102. Guest mode access can be restricted so that access is only allowed on one of the other devices that has been authorized by the user 102.

Potentially, the user can restrict that further to make the login functionality conditioned on certain constraints, such as: (1) the user 102 can only complete a guest mode login on another device 120 if his own device 110 is out of battery, (2) the user 102 can only complete a guest mode login on another device 120 if he explicitly confirms on his own device 110; or (3) the user can only complete a guest mode login on another device 120 if there is a certain confidence that the device 110 was forgotten at a known or designated location (e.g., a typical home, work, or other location). In some instances, a decision whether a phone has been forgotten at a location can be deduced through heuristics, such as determining that the phone was not moved for at least a threshold amount of time. As another example, devices may have a context-aware, on-device machine learning model which is trained to indicate whether the phone was lost or not.

For selecting a nearby device to sign-in to, while the device 110 still has battery power, the device 110 could prompt the user 102 that he are going to quickly run out of battery, and inform the user 102 that several nearby devices would be available for trusted log-in.

If the conditions for allowing guest mode access are met, then the user 102 can attempt to log-in from the device 120 of one of his trusted contacts. The user 102 would then authenticate on the device 120 to access resources from the device 110. The authentication can again be done in various different ways, such as a swipe pattern (e.g., one originally added by the user 102 for the device 110), through a password, through the fingerprint reader on the device 120, etc. For any of these options, the authentication reference data or standard for comparison can be obtained by the server system 130 from the device 110, and the synchronized to the device 120 by the server system 130 or simply evaluated by the server system 130. Login functionality can be implemented on a system-level, and the separate applications that are accessible through the guest mode can rely on the system-level authentication and do not need to re-implement their own authentication procedures.

After the guest mode login process is successfully completed, the system 100 provides functionality of the first device 110 on the second device 120. In general, each application that make use of the cross-device functionality determines which functionality of the application will be provided in the guest mode. In order to do specify this set of functionality, the system 100 may provide additional library functionality to help implement a "light" version of an application. For example, a version of the application 150 may be run in the cloud (e.g., on the server system 130), in parallel with execution of the application 150 on the device 110. The cloud or instance of the application 150 may then be accessible from the device 120 while operating in the guest mode. An application that offers this functionality can have its current state synchronized in the cloud as snapshots. This synchronized state can be used to reproduce the user interface and interactions in the lightweight version of the application in the guest mode. The synchronization of application state can be implemented fully by the application, or synchronization can be managed by an operating system of a device or a server system. In some implementations, certain variables in an application can be designated for synchronization, e.g., through metadata or a data flag that a parameter should be "cloud synced," and then an operating system on the device 102 would initiate and carry out the synchronization, either in response to changes in the parameter or on a periodic basis.

When the user logs in from the device 120 in the guest mode, the latest snapshot of the lightweight synchronization with device 110 is downloaded onto device 120. The downloaded snapshot (e.g., data specifying the most recent parameter values for application parameters designated to be synchronized) is used to instantiate the lightweight version of the application 150 for the user 102 of the device 110. The user 102 can then use, on the device 120, whatever functionality the lightweight version of the application 150 allows.

As an example, a messaging application may implement a lightweight version where it is only possible to see incoming chats and reply to them, but not create new ones. The messaging application would then only need to sync minimal settings (such as font settings, background color, etc.) of the user 102 but nothing about the open chats. As soon as the user 102 of the device 110 logs in from the device 120, the application instance on the device 120 would get notified that it now also acts as a lightweight agent for the user 102 of the device 110, and would initiate the sync down from the latest snapshot. Whenever the user 102 of the device 110 then receives a message, it is shown in the lightweight interface of the device 120 in addition to the device 110 (assuming it is still running).

As another example, a mapping application has features to specially mark places the user is interested in. A group of friends might be on a city trip, and one of them has a lot of places to visit in the city starred, but is running out of battery. Through the techniques in this document, he could then login to one of his friends' phones, and the mapping application could automatically offer the functionality to overlay those place markings when a user logs in through the lightweight guest mode API. In other cases, the contacts layer of the phone could provide a lightweight interface through the contacts of the user's original phone, to address the case when one user needs to contact someone else, and contact details are on that phone that ran out of battery but not the phone being used for guest mode access.

One case of interest is when the user is traveling with multiple friends that have different sets of applications installed, where one or more of the devices providing the kind of lightweight logging functionality to track the state of applications on an on-going basis. In such a situation, if the user 102 desired to use multiple applications transferred to another device, it is possible that no single nearby device may provide each of multiple applications that user 102 desires to use. The user 102 might need to make use of one's friend device for using a messaging application, and use another friend's device to use a mapping application. For such cases, an extension of the API could provide a suggestion on the device 110 of the different nearby devices available, along with the specific applications on those devices that have the guest mode functionality enabled. This can be limited unless if the owner of the neighboring device agrees to share such information. The user 102 could then, potentially with a simple tap, select a particular device and authorize or even initiate the guest mode login.

In some implementations, the guest mode API can also allow lightweight log-in functionality across devices of the same user, e.g., a tablet and a phone linked to the same user account or user identity. Even if a developer does not provide a version of a full application for one type of device (e.g., the tablet computer), the application may still allow some minimal functionality via a lightweight universal interface, for the convenience of the user, which takes advantage of the guest mode API.

FIG. 2B is a diagram illustrating a user interface 210 for extending application access across devices. The user interface 210 shows controls that enable the first user 102 to specify log-in credentials (e.g., a password, personal identification number (PIN), pattern of swiping across a touchscreen, etc.) for authenticating into guest mode on another device. These credentials can be different from those used to gain access to the user's primary device 110. To enhance security, different passwords or other credentials may be set for authenticating for guest mode and for normal access to the user's device 110. This allows the first user 102 to provide credentials and obtain access in guest mode without divulging, at a potentially risky device of a different user, the user's credentials for obtaining full access to the user's device 110.

Figure 3:
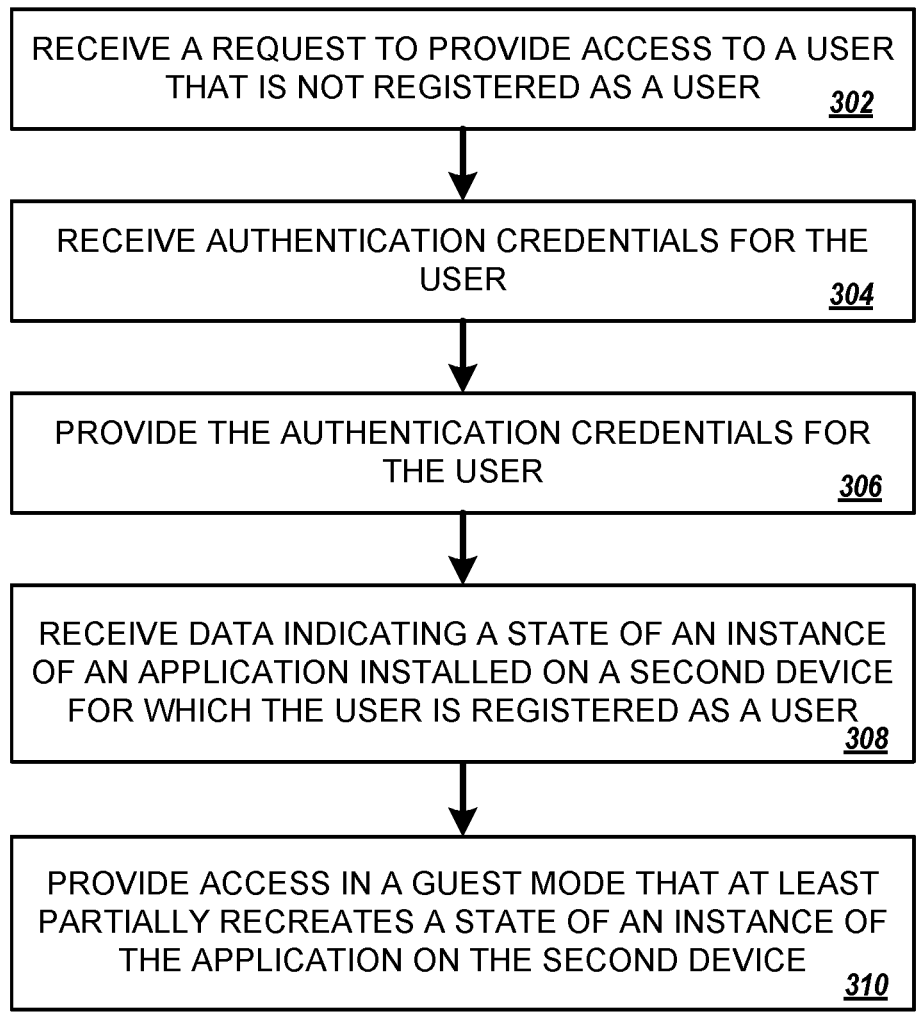
FIGS. 3-5 are flow diagrams that illustrate examples of processes for extending application access across devices.

FIG. 3 is a flow diagram that illustrates an example of a process 300 for extending application access across devices. The process 300 may be performed by a user device, such as a mobile phone. For example, the process may be performed by an electronic device such as the second device 120 discussed above.

In the process 300, an electronic device receives a request to provide access to a particular user that is not registered as a user of the electronic device (302). The electronic device may be a mobile phone that is not associated with any user account of the particular user.

The electronic device receives authentication credentials for the particular user (304). The received authentication credentials may include credentials that unlock a device e.g., the phone of the particular user, for which the particular user is a registered user. In addition or as an alternative, the authentication credentials can include other credentials that the particular user has designated for obtaining access to applications and/or user data of the particular user through a guest mode.

The electronic device provides the authentication credentials for the particular user to a server system (306).

After providing the authentication credentials, the electronic device receives data from the server system (308). The received data can be data that (i) indicates that the providing access to the electronic device in a guest mode is authorized, and (ii) indicates a state of an instance of an application installed on a second device for which the particular user is registered as a user.

The electronic device provides access to the electronic device in a guest mode (310). The guest mode provides an interface that at least partially recreates a state of the instance of the application installed on the second device for which the particular user is a registered user. The electronic device can have a registered user that is different from the particular user. The electronic device can block access to user data for the registered user in the guest mode. The electronic device can provide access to the guest mode from a lock screen or other secured interface, so that the registered user does not need to log into the electronic device. Indeed, the guest mode access can be provided while the user account for the registered user is locked or logged out.

The electronic device can have an instance of the application installed on the electronic device. In the guest mode, the electronic device provides access to a subset of the functionality of the application, e.g., a predetermined subset designated for access in the guest mode.

In some implementations, providing access to the electronic device in the guest mode includes providing access to a native application that is installed on the electronic device and that is not a web browser. The guest mode can provide at least partial functionality of the native application, with the interface of the native application being configured to replicate at least a portion of an interface of the application on the second device for which the particular user is a registered user. The electronic device may communicate with the server system to request and obtain data that specifies characteristics of the application on the second device, such as application state, user preferences, customizations, etc. The interface shown in the guest mode can be generated based on the data that specified these characteristics, which can automatically customize the interface for the particular user without manual changes to the interface.

Figure 4:
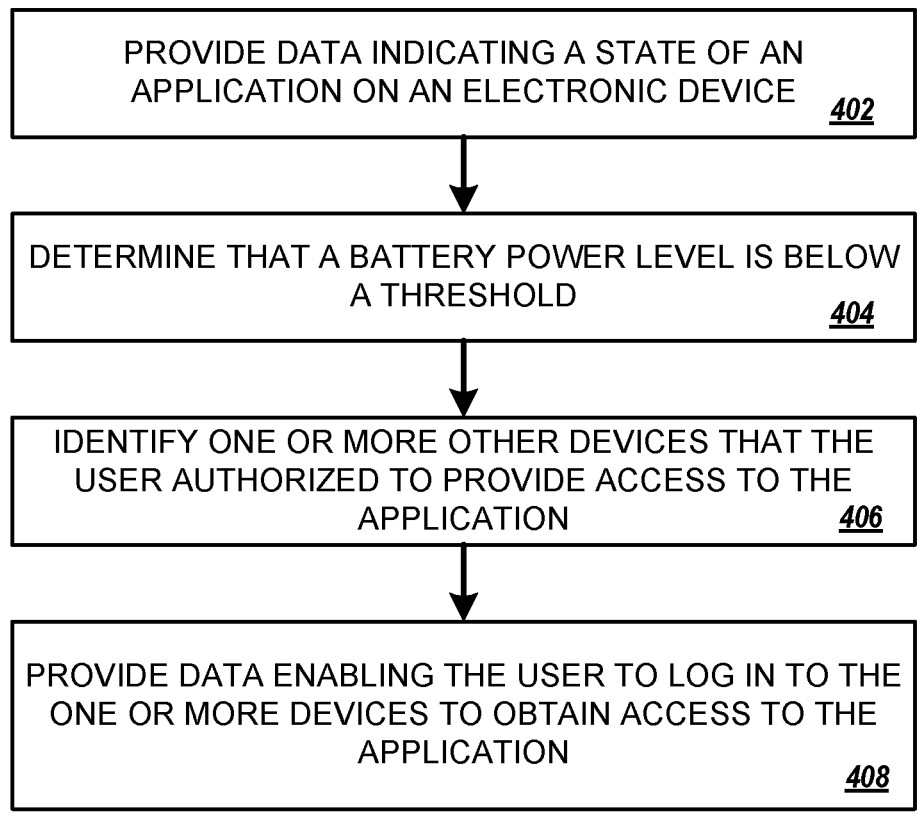

FIG. 4 is a flow diagram that illustrates an example of a process 400 for extending application access across devices. The process 400 may be performed by a user device, such as a mobile phone. For example, the process may be performed by an electronic device such as the first device 110 discussed above.

In the process 400, an electronic device provides data indicating a state of an application on the electronic device, where the electronic device is registered to a user (402). This data can be provided to a server system. The electronic device may periodically send updates about the state of one or more applications on the electronic device. The information may be provided, for example, at a time interval or in response to changes in application state.

The electronic device determines that a battery power level of the electronic device is below a threshold (404). In some implementations, guest mode is not available to a user unless the user's primary device is inaccessible or is likely to be inaccessible soon. A low battery power level may thus be a set as a requirement for an electronic device to allow alternative access through a guest mode. In addition, or as an alternative, other requirements may be set for enabling a user to access applications through a guest mode on another user's device.

The electronic device identifies one or more other devices that the user has authorized to provide access to the application, where the user is not registered as one or more devices for which the user is not registered to obtain access (406).

In some implementations, the electronic device determines that a particular device of the one or more other devices is within a threshold level of proximity to the electronic device. In response, the electronic device can indicate, on a display of the electronic device, that the particular device is nearby. The proximity of a particular device can be determined based on a wireless signal from the particular device which is received by the electronic device, or based on an indication of the location of the particular device from the server system.

In some implementations, after indicating that the particular device is nearby, receiving user input indicating authorization to enable access, on the particular device, to an instance of the application with user-specific data for the user. Providing the data enabling the user to log in to the one or more other devices includes sending send data to enable log in of the user on the particular device that the user selected to authorize.

In response to determining that the battery power level is below the threshold, the electronic device provides, to the server system or to the one or more other devices, data enabling the user to log in to the one or more other devices to obtain access to the application (408). Providing this data may include sending a message to the server system indicating that the battery power level is below the threshold. In some implementations, after providing the data enabling the user to log in to the one or more other devices, the electronic device shuts itself down.

In some implementations, the electronic device may determine other information instead of or in addition to a battery power level. For example, the electronic device may access a movement history, device location data (e.g., GPS data), connectivity data (e.g., a Wi-Fi network name or access point identifier). The device may use this information to determine whether to enable the user to log into one or more other devices. For example, the electronic device may determine that it is at a known location, e.g., the user's home or work, or may determine that it has not moved for at least a threshold amount of time. On or more of these determinations, in addition to or instead of the batter power level being below a threshold, may cause the electronic device to provide data enabling the user to log in to the one or more other devices.

Figure 5:
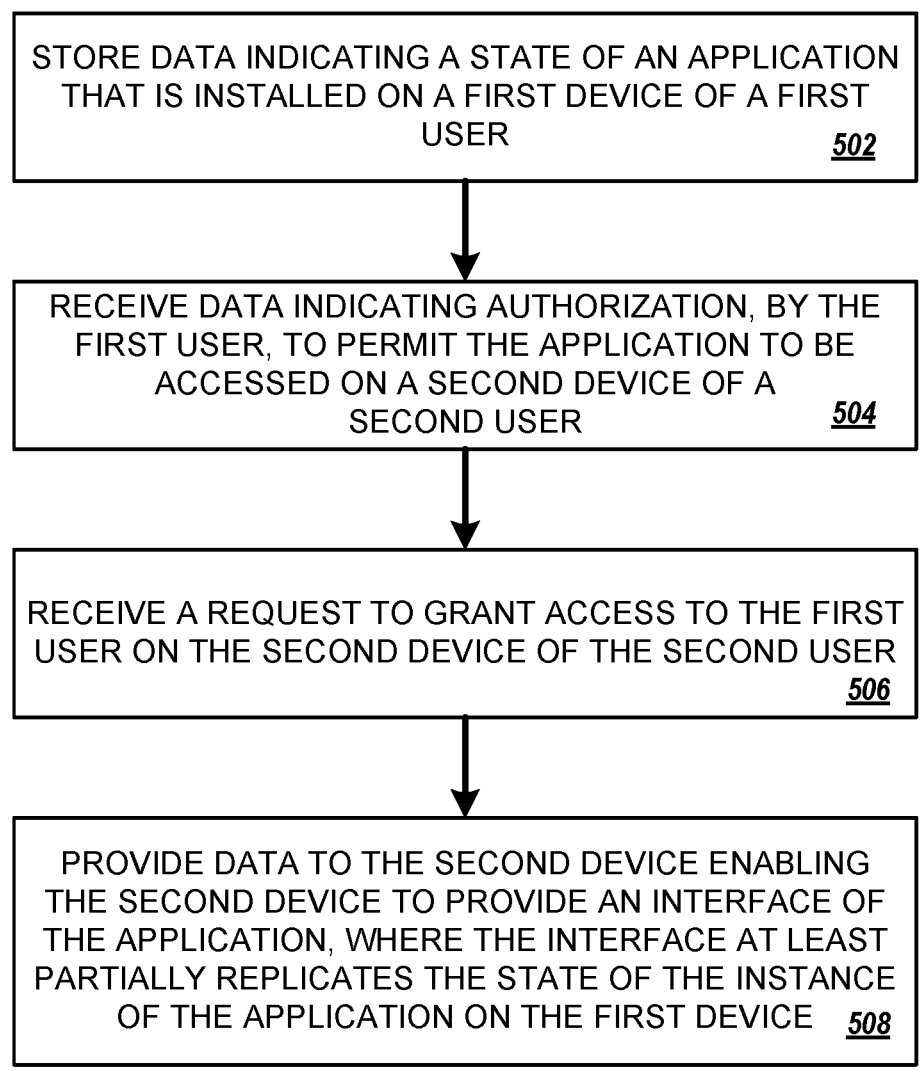

FIG. 5 is a flow diagram that illustrates an example of a process 500 for extending application access across devices. The process 500 may be performed by one or more computers, for example, the server system 130 discussed above.

In the process 500, one or more computers store data indicating a state of an instance of an application that is installed on a first device registered to a first user (502).

The one or more computers receive data from the first device indicating authorization by the first user to permit the application to be accessed on a second device registered to a second user (504).

The one or more computers receive a request to grant access to the first user on the second device of the second user (506).

Based on data indicating the authorization by the first user, the one or more computers provide data to the second device enabling the second device to present, on the second device, an interface of the application that at least partially recreates the state of the instance of the application that is on the first device (508). The one or more computers can enable the second device to present the interface based on proximity based on determining that the second device is within a threshold level of proximity of the first device.

The data enabling the second device can be provided in response to receiving user credential data for the first user from the second device, and verifying that the user credential data is valid for the first user. The first device can have a device-level user credential for login to the first device. The first device can have multiple applications that each have a separate user account with different application-level login credentials. The user credential data provided can be the device-level user credential for the first device. Based on verifying the device-level user credential for the first device, the one or more computers can provide data enabling the second device to provide an interface of each of or any of the multiple applications. The interface of the second device can have user-specific content replicated from instances of the multiple applications on the first device, without requiring the application-level login credentials to be provided to the second device. For example, the first user may have a messaging application and an email application on the first device, each having separate user accounts and settings, including different log-in credentials. The guest mode can provide the first user access to both the messaging application and the email application in the guest mode on the second device, using only a single user credential to enter the guest mode, without requiring the application-level log-in credentials.

In some implementations, the first device is a mobile phone of the first user and wherein the second device is a mobile phone of the second user.

In some implementations, the process 500 includes determining that the first device is likely inaccessible to the first user. Providing the data enabling the second device to present the interface can be conditioned on and performed in response to determining that the first device is likely inaccessible to the first user. To determine that the first device is likely inaccessible to the first user, the one or more computers may determine that the first device is powered off or has a battery power level below a threshold.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. An electronic device comprising:
   one or more processors; and data storage including at least computer-executable instructions stored thereon that, when executed by the one or more processors, cause the electronic device to perform functions comprising:
   receiving, by the electronic device, a request to provide access to the electronic device to data of a particular user that is not registered as a user of the electronic device;
   receiving, by the electronic device, authentication credentials for the particular user;
   providing, by the electronic device, the authentication credentials for the particular user to a server system; after providing the authentication credentials, receiving, by the electronic device, data from the server system that (i) indicates that the providing limited access to data of an application installed on a second device for which the particular user is registered as a user is authorized, and (ii) indicates a state of an instance of the application installed on the second device for which the particular user is registered as a user, wherein the data that indicates that providing limited access is authorized is based on prior user input selecting a trusted user from a contact list of users provided at a user interface of the second device, wherein the trusted user is a registered user of the electronic device; and
   providing, by the electronic device, limited access based on synchronized application state data of the application installed on the second device for which the particular user is registered as a user, wherein providing limited access comprises providing access to a native application that is installed on the electronic device, wherein an interface of the native application is configured to replicate at least a portion of an interface on the second device for which the particular user is registered as a user.

2. The electronic device of claim 1, wherein the electronic device has an instance of the application installed on the electronic device, and wherein providing limited access comprises providing access to a subset of features of the application.

3. The electronic device of claim 2, wherein the subset of the features of the application to which to provide access is a predetermined subset designated for limited access.

4. The electronic device of claim 1, wherein the native application is not a web browser.

5. The electronic device of claim 1, wherein the electronic device is a mobile phone not associated with any user account of the particular user.

6. The electronic device of claim 1, wherein providing, by the electronic device, limited access based on synchronized application state data of the application installed on the second device for which the particular user is registered as a user comprises downloading a snapshot of the synchronized application state data.

7. The electronic device of claim 6, wherein the snapshot of the synchronized application state data comprises data specifying parameter values for application parameters that are designated to be synchronized.

8. The electronic device of claim 6, wherein the snapshot of the synchronized application state data is a most recent version of the synchronized application state data.

9. The electronic device of claim 1, wherein providing, by the electronic device, limited access comprises providing minimal functionality of the application using a lightweight universal interface.

10. The electronic device of claim 1, wherein the received authentication credentials are different than the authentication credentials of the trusted user for the electronic device.

11. The electronic device of claim 1, wherein providing by the electronic device, limited access is through a secured interface.

12. The electronic device of claim 1, wherein the received authentication credentials comprise credentials that the particular user designated for allowing limited access to user data of the particular user.

13. The electronic device of claim 1, wherein the synchronized application state data is updated at regular intervals.

14. The electronic device of claim 1, wherein the synchronized application state data is updated in response to one or more changes in the application.

15. The electronic device of claim 1, wherein the synchronized application state data is updated in response to user inputs to the application.

16. The electronic device of claim 1, wherein the synchronized application state data is triggered by one or more particular types of inputs or changes.

17. A method performed by an electronic device, the method comprising:
receiving, by the electronic device, a request to provide access to the electronic device to data of a particular user that is not registered as a user of the electronic device;
receiving, by the electronic device, authentication credentials for the particular user;
providing, by the electronic device, the authentication credentials for the particular user to a server system;
after providing the authentication credentials, receiving, by the electronic device, data from the server system that (i) indicates that the providing limited access to data of an application installed on a second device for which the particular user is registered as a user is authorized, and (ii) indicates a state of an instance of the application installed on the second device for which the particular user is registered as a user, wherein the data that indicates that providing limited access is authorized is based on prior user input selecting a trusted user from a contact list of users provided at a user interface of the second device, wherein the trusted user is a registered user of the electronic device;
and providing, by the electronic device, limited access based on synchronized application state data of the application installed on the second device for which the particular user is registered as a user, wherein providing limited access comprises providing access to a native application that is installed on the electronic device, wherein an interface of the native application is configured to replicate at least a portion of an interface on the second device for which the particular user is registered as a user.

18. A non-transitory computer readable medium storing program instructions executable by one or more processors to cause the one or more processors to perform operations comprising:
receive, by an electronic device, a request to provide access to the electronic device to data of a particular user that is not registered as a user of the electronic device;
receive, by the electronic device, authentication credentials for the particular user;
provide, by the electronic device, the authentication credentials for the particular user to a server system;
after providing the authentication credentials, receive, by the electronic device, data from the server system that (i) indicates that the providing limited access to data of an application installed on a second device for which the particular user is registered as a user is authorized, and (ii) indicates a state of an instance of the application installed on the second device for which the particular user is registered as a user, wherein the data that indicates that providing limited access is authorized is based on prior user input selecting a trusted user from a contact list of users provided at a user interface of the second device, wherein the trusted user is a registered user of the electronic device; and
provide, by the electronic device, limited access based on synchronized application state data of the application installed on the second device for which the particular user is registered as a user, wherein providing limited access comprises providing access to a native application that is installed on the electronic device, wherein an interface of the native application is configured to replicate at least a portion of an interface on the second device for which the particular user is registered as a user.

* * * * *